United States Patent [19]
Buchwald et al.

[11] 4,175,283
[45] Nov. 20, 1979

[54] BATCH OPTION MODULE

[75] Inventors: Warren G. Buchwald; David W. Norris, both of Marshalltown, Iowa

[73] Assignee: Fisher Controls Company, Inc., Marshalltown, Iowa

[21] Appl. No.: 899,131

[22] Filed: Apr. 24, 1978

[51] Int. Cl.² ............... G06G 7/66; G06G 7/58; G05B 11/36

[52] U.S. Cl. ............... 364/117; 318/610; 364/105; 364/500; 422/110; 23/230 A

[58] Field of Search ............... 364/105, 117, 119, 500, 364/114, 115; 318/609, 610; 23/230 R, 230 A; 422/105, 108, 110, 119

[56] References Cited

U.S. PATENT DOCUMENTS

| | | | |
|---|---|---|---|
| 3,377,547 | 4/1968 | Ohlson | 318/610 X |
| 3,566,241 | 2/1971 | Ross | 318/610 X |
| 3,582,629 | 6/1971 | Ross | 318/610 X |
| 3,819,999 | 6/1974 | Platt | 318/609 |
| 3,938,017 | 2/1976 | Hayes | 318/610 |

OTHER PUBLICATIONS

Bulletin 1.7:011, "Anti-Reset Windup Module"—Fisher Controls Company, Marshalltown, Iowa, Feb., 1974.
Technical Information 39-202a "Model 62H High--Low Batch Switch"—Foxboro Co., Foxboro, Mass., Jul., 1967.
Bulletin 860-2 Issue 1 "ETOS Two and Three Mode Controller Reset Limiting Kit #373672-1", Honeywell, Phila., Pa.—1964.
*Process Control Systems*—Shinsky, McGraw-Hill Book Co., New York, N.Y., 1967, pp. 96–98.
Bulletin Type TL103 Appendix A2 "Anti-Reset Windup Module" Fisher Controls Co., Marshalltown, Iowa—Feb., 1974.

*Primary Examiner*—Joseph F. Ruggiero
*Attorney, Agent, or Firm*—Lawrence L. Limpus

[57] ABSTRACT

A Batch Option Module is provided for a process control instrument. Whenever the process control instrument reaches the limits of its control range, the Batch Option Module is activated to limit the output of the instrument as a function of the process variable, the setpoint, and an adjustable bias. When the output of the instrument due to normal control action no longer trys to exceed the Batch Option Module limit, the Batch Option Module is deactivated.

3 Claims, 6 Drawing Figures

BATCH OPTION MODULE

BACKGROUND OF THE INVENTION

This invention relates to a process control instrument.

More particularly this invention relates to a process control instrument for controlling a process variable during a batch reaction cycle.

Even more particularly this invention relates to an integral limiting device for a process controller which will eliminate overshoot of the controlled process variable during an exothermic batch reaction cycle.

Heretofore it has been a common practice to install an anti-reset windup module in instruments that are removed from control of the process periodically, for example in a batch process. Without the anti-reset windup module, whenever a sustained deviation from the setpoint is imposed upon a control instrument, the instrument output will eventually be driven off scale. If the instrument were then returned to control of the process, no control action could be taken by the instrument until it has recovered from being driven off scale, that is until after the setpoint has been crossed by the process variable. The anti-reset windup is used to prevent the instrument from being driven off scale. However, even though the use of the anti-reset windup module will reduce the overshoot, that is the amount by which the process variable exceeds the setpoint, it will not eliminate the overshoot entirely unless the module's high limit is set so low as to greatly extend the time required to complete a batch cycle. Thus for a batch process the present anti-reset windup module is useful but not completely successful.

SUMMARY OF THE INVENTION

It is an object of this invention to provide a Batch Option Module, an improved anti-reset windup circuit, for use with a process control instrument to control a process variable during a batch reaction cycle.

A further object of this invention is to provide a Batch Option Module, for a process control instrument which will eliminate overshoot of the controlled process variable during an exothermic batch reaction cycle.

Another object of this invention is to provide a Batch Option Module, an improved anti-reset windup circuit in which the controller output is set as a function of the process variable being controlled and the set point.

To achieve these objects, as well as other objects which will become apparent hereinafter, we provide a process controller, an instrument for controlling one process variable, equipped with the Batch Option Module circuit of this invention. The Batch Option Module operates to force the process controller output up or down so the the output remains within the control limits of the process controller according to a batch limit set by the Batch Option Module as a function of the measured process variable, the process controller set point, and an adjustable bias.

BRIEF DESCRIPTION OF THE DRAWINGS

Attention is now directed to the drawings, in which.

DESCRIPTION OF THE PREFERRED EMBODIMENT

Figure 1:
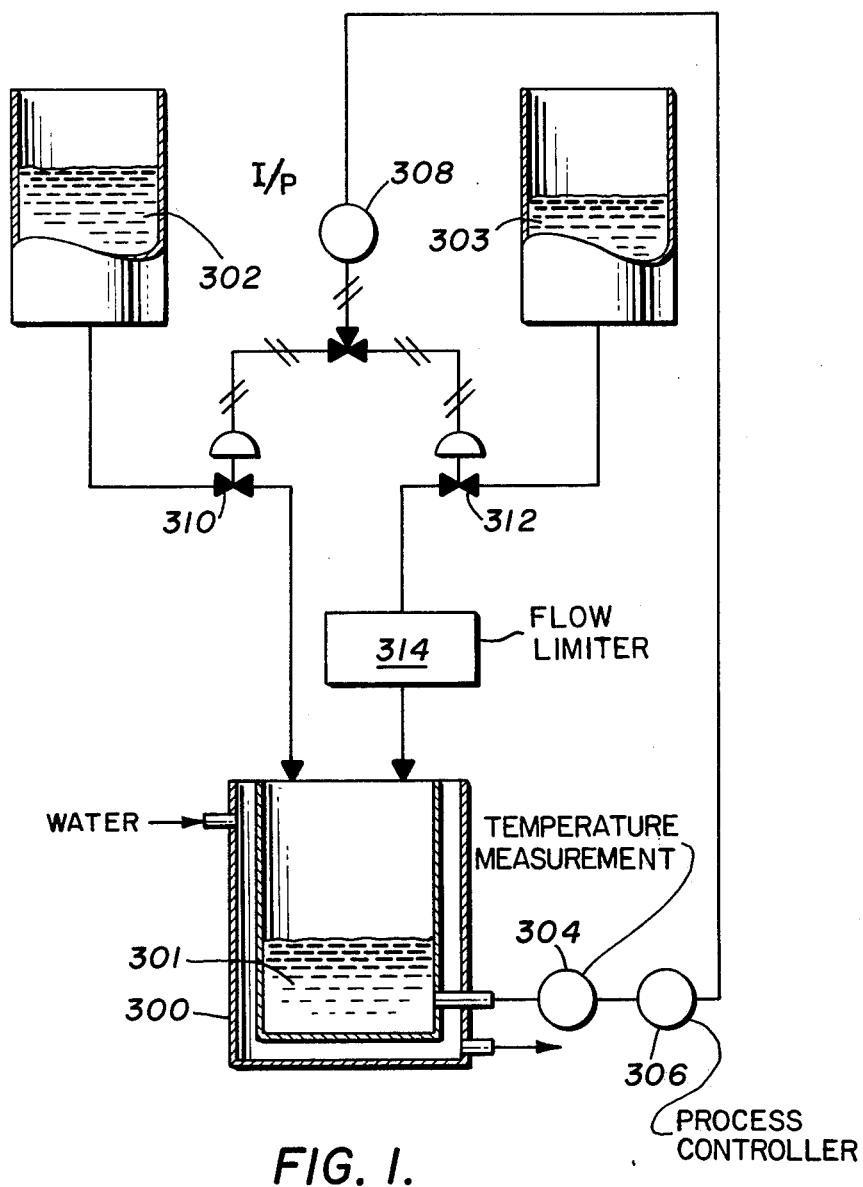
FIG. 1 is a representation of one control configuration which would use the Batch Option Module of this invention.

Referring now to the drawings where like numbers are used to designate like or similar parts, FIG. 1 shows a typical control scheme for use on a reactor in which an exothermic batch reaction takes place during the sequential addition of three raw materials.

A reactor 300 having a water cooled jacket is shown. Ice water is circulated continuously through the reactor jacket to provide cooling during the batch cycle. The reactor 300 is charged with a first liquid 301 and second and third liquids, 302 and 303 are sequentially added. Temperature measurement means 304, in this instance a thermocouple, is located on or within the reactor 300. The temperature measurement means 304 provides the input to the process controller 306 which includes the Batch Option Module. The output of the process controller is sequentially applied to first and second valves 310 and 312 to add second liquid 302 and third liquid 303. A current-to-pneumatic transducer (I/P) 308 is required to convert the electrical output signal from process controller 306 to a pneumatic signal to control the control valves 310 and 312. As a safety precaution, flow limiting means 314 is installed in the pipe supplying third liquid 303 to reactor 300.

Figure 2:
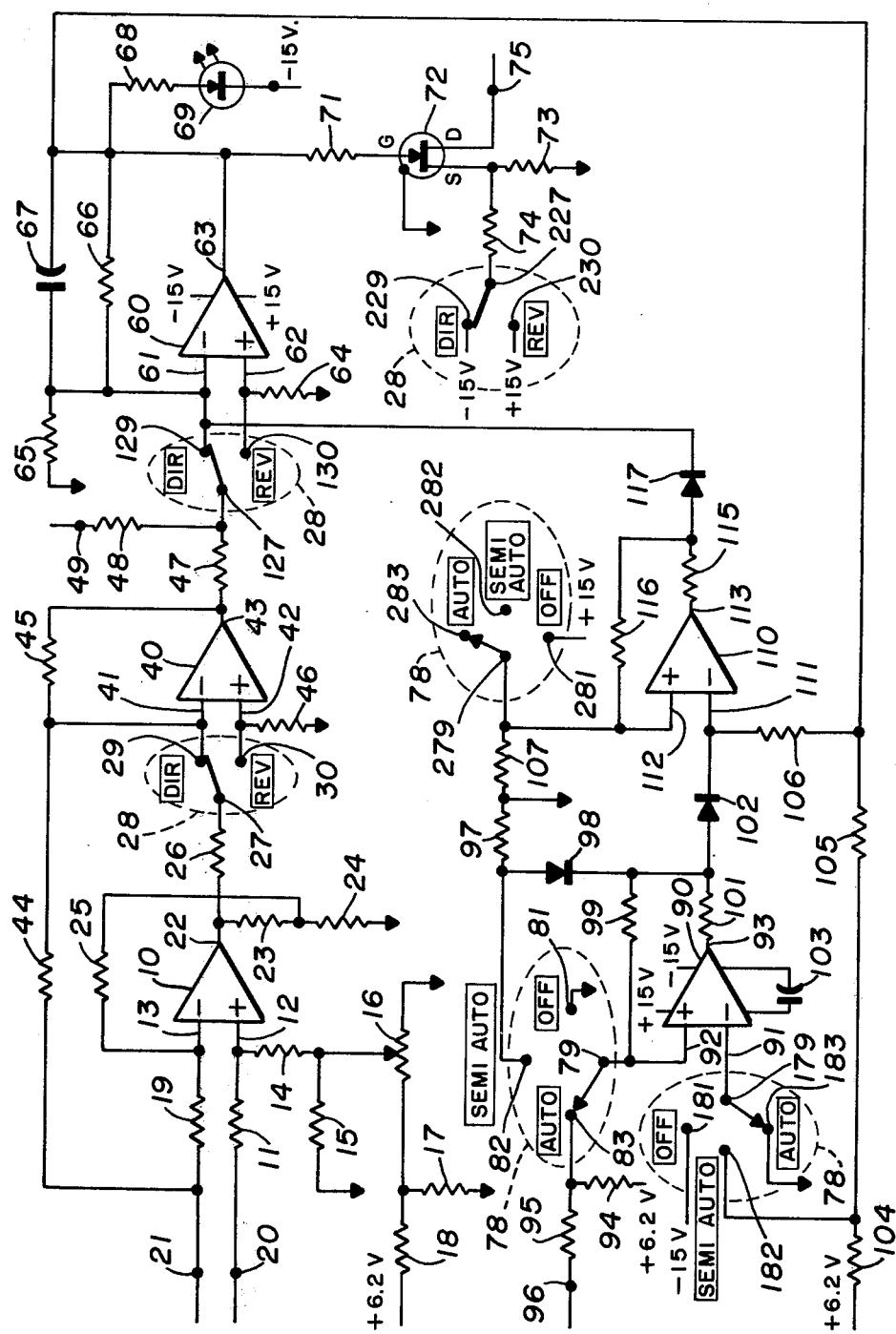
FIG. 2 is a schematic of the Batch Option Module.

Referring now to FIG. 2 a schematic diagram of the Batch Option Module of this invention is shown. The Batch Option Module is connected within a process controller which has been omitted from the schematic of FIG. 2. Four variable inputs, a positive and negative fifteen volts (±15 volts) and a positive 6.2 volts (+6.2 volts) are provided to the Batch Option Module by the process controller.

A first amplifier 10 is shown. Resistor 11 is connected to the positive input terminal 12 of amplifier 10. The other end of resistor 11 is connected at terminal 20 to the process controller. Resistor 14 is also connected to the positive input terminal 12 of the amplifier 10. The end of resistor 14 not connected to the positive input terminal 12 of amplifier 10 is connected to ground through resistor 15 and to the wiper of variable resistor 16. One terminal of variable resistor 16 is connected directly to ground and the other terminal of variable resistor 16 is connected to resistors 17 and 18. Resistor 17 is connected between variable resistor 16 and ground, while resistor 18 is connected between variable resistor 16 and a positive 6.2 volt (+6.2 volt) supply terminal within the process controller. Resistor 19 is connected to the negative input terminal 13 of amplifier 10. The opposite end of resistor 19 is connected at terminal 21 to the process controller. The output of amplifier 10, at terminal 22, is connected to one end of resistors 23 and 26. Resistor 24 is connected between the second end of resistor 23 and ground, and resistor 25 is connected between the second end of resistor 23 and the negative input terminal 13 of amplifier 10. Resistor 26 is connected between the output terminal 22 of amplifier 10 and terminal 27 of switch 28.

Switch 28 is a three gang switch, that is it has three separate switching elements, with each gang having two positions which are labeled "Direct" and "Reverse". Terminal 27 is connected to the movable contact means of the first gang of switch 28 which may be switched to connect terminal 27 with either terminal 29 or 30 of switch 28. The movable contact means of each gang of switch 28 is moved simultaneously with each other movable contact means.

Terminal 29 of switch 28 is connected to the negative input terminal 41 of amplifier 40. Resistor 44 is connected between the negative input terminal 41 of amplifier 40 and terminal 21 within the process controller. One end of resistor 45 is also connected to negative input terminal 41 of amplifier 40 while th other end is connected to the output terminal 43 of amplifier 40. Terminal 30 of switch 28 is connected to the positive input terminal 42 of amplifier 40 and, through resistor 46, to ground.

The output terminal 43 of amplifier 40 is connected through resistor 47 to terminal 127 of switch 28. One end of resistor 48 is also connected to terminal 127 of switch 28 and the other end of resistor 48 is connected at terminal 49 to the process controller. Terminal 127 of switch 28 is connected to the movable contact means of the second gang of switch 28 which may be switched to connect terminal 127 with either terminal 129 or 130.

Terminal 130 of switch 28 is connected to the positive input terminal 62 of amplifier 60 and, through resistor 64, to ground. Terminal 129 of switch 28 is connected to the negative input terminal 61 of amplifier 60 and, through resistor 65, to ground. Resistor 66 and capacitor 67 are connected in parallel between the output terminal 63 and the negative input terminal 61 of amplifier 60. A negative fifteen volt (−15 volt) is applied to one power supply terminal of amplifier 60, and a positive fifteen volt (+15 volt) is applied to the other power supply terminal.

The output terminal 63 of amplifier 60 is also connected, through resistor 68 in series with light emitting diode 69, to a negative fifteen volt (−15 volt) power supply with the cathode of diode 69 being connected to the power supply. In addition, the output terminal 63 of amplifier 60 is connected through resistor 71 to the gate of field effect transistor (FET) 72. The source of FET 72 is connected through resistor 73 to ground and through resistor 74 to terminal 227 of switch 28. Terminal 227 is connected to the movable contact means of the third gang of switch 28 which may be switched to connect terminal 227 with either terminal 229 or 230. Terminal 229 is connected to a negative fifteen volt (−15 volt) power supply and terminal 230 is connected to a positive fifteen volt (+15 volt) supply. The drain of FET 72 is connected at terminal 75 to the process controller. The case of FET 72 is connected to ground.

Switch 78 is like switch 28 in that it is a three gang switch; but, switch 78 has three positions which are labeled "Off", "Semiauto", and "Auto". As with switch 28, the movable contact means of each gang of switch 78 is moved from one position to another simultaneously with each other movable contact means.

The positive input terminal 92 of amplifier 90 is connected at terminal 79 to the movable contact means of the first gang of switch 78. The movable contact means may be switched to connect terminal 79 to any of the three positions represented by terminals 81, 82, and 83. Terminal 81, labeled "Off", is connected to ground. Terminal 83, labeled "Auto", is connected through resistor 94 to a positive 6.2 volt (+6.2 volt) power supply and through resistor 95 to the process controller at terminal 96. Terminal 82, labeled "Semiauto", is connected to a first end of resistor 97 and to the anode of diode 98. The cathode of diode 98 is connected through resistor 99 to the positive input terminal 92 of amplifier 90, through resistor 101 to the output terminal 93 of amplifier 90, and to the anode of diode 102. The cathode of diode 102 is connected to the negative input terminal 111 of amplifier 110.

Amplifier 90 is also connected to a positive fifteen volt (+15 volt) supply and to a negative fifteen volt (−15 volt) supply at its power supply terminals. In addition capacitor 103 is connected between the frequency compensation terminals of amplifier 90.

The negative input terminal 91 of amplifier 90 is connected to the movable contact means of the second gang of switch 78 at terminal 179. The movable contact means may be switched to connect terminal 179 to terminals 181, 182, or 183. Terminal 181, labeled "Off", is connected to a negative fifteen volt (−15 volt) supply and terminal 183, labeled "Auto", is connected to ground. Terminal 182, labeled "Semiauto", is connected through resistor 104 to a positive 6.2 volt (+6.2 volt) supply. Terminal 182 is also connected to a first end of resistor 105. The second end of resistor 105 is connected to the output terminal 63 of amplifier 60 and, through resistor 106, to the negative input terminal 111 of amplifier 110.

As noted above, the output of amplifier 90 is connected through resistor 101 and diode 102 to negative input terminal 111 of amplifier 110. Also connected to terminal 111 is one end of resistor 106, the second end of which is connected to both the second end of resistor 105 and the output terminal 63 of amplifier 60. The positive input terminal 112 of amplifier 110 is connected to a first end of resistor 107. The second end of resistor 107 is connected to the second end of resistor 97 and to ground.

The positive input terminal 112 of amplifier 110 is also connected to the movable contact means of the third gang of switch 78 at terminal 279. The movable contact means may be switched to connect terminal 279 with any of terminals 281, 282, or 283. Terminal 281, labeled "Off", is connected to a positive fifteen volt (+15 volt) supply. Terminals 282 and 283, labeled "Semiauto" and "Auto" respectively, are not connected to anything.

The output terminal 113 of amplifier 110 is connected to a first end of resistor 115. The second end of resistor 115 is connected through resistor 116 to the positive input terminal 112 of amplifier 110 and is connected to the cathode of diode 117. The anode of diode 117 is connected to the negative input terminal 61 of amplifier 60.

Amplifiers 10, 40, 60, and 110 are connected such that the positive and negative fifteen volt (±15 volt) power supplies which are connected to the power supply terminals of amplifier 60 are also connected (though not shown) to the power supply terminals of amplifiers 10, 40, and 110.

Returning now to FIG. 1, a batch reactor 300 for a two stage exothermic reaction is shown with a control configuration for control of the temperature within the reactor 300. The batch temperature is controlled by regulating the reactant flows, that is the flows of second and third liquids 302 and 303, while ice water, or chilled water, is continuously circulated through the reactor jacket. The reactor 300 is charged with a first liquid 301. The first phase of the reaction is initiated when the process controller 306 opens control valve 310 to add second liquid 302 to the reactor 300. The temperature of the mixed first and second liquids 301 and 302 rises rapidly and is then maintained at its specified temperature as the process controllers 306 throttles the first control valve 310. When the entire quantity of second liquid 302 has been added to the reactor 300, the output of process controller 306 is transferred to control second control valve 312 for the remainder of the reaction cycle to regulate the addition of third liquid 303 to the batch reactor 300. For safety, in the event of an instrument failure, the addition of third liquid 303 to the batch reactor is further limited by the inclusion of flow limiting means 314 in the pipe supplying third liquid 303 to the reactor 300.

The Batch Option Module operates by forcing the process controller output up or down according to a batch limit which is set by the Batch Option Module as a function of the measured process variable, the process controller set point, and an adjustable bias. The Batch Option Module as shown in FIG. 2 includes comparator circuitry to automatically deactivate the Module to allow full range process controller output after the heat-up phase of a reaction cycle and to reactivate the Module whenever the process controller output reaches an integral limit.

During operation of the Batch Option Module, the measured process variable is applied to the positive input terminal 12 of amplifier 10. An adjustable bias is also applied to terminal 12. The resistor network including adjustable resistor 16, which is connected to the positive input terminal 12 of amplifier 10 provides the bias which is adjustable.

In reverse action of the Batch Option Module, increasing the bias setting will cause the batch limit during the batch heat-up phase to force the process controller output down out of its limit condition at a lower batch termperature. If the bias is set too high, the process controller will be limited such that the batch temperature will not reach the set point, and the batch circuit will never deactivate to allow normal controller action. If the bias is set too low, the controller output will not be forced down soon enough, and the batch temperature will overshoot the set point.

The set point, manually determined by the requirements of the process, is applied to the negative input terminal 13 of amplifier 10, to the negative input terminal 41 of amplifier 40.

Amplifier 10 has a gain K, thus the voltage at the output of the amplifier 10 is:

$$V = K(PV + B - SP)$$

where
SP=set point signal;
PV=process variable; and
B=bias;
K=gain

Switch 28 may be switched to select the proper batch limit function for the process controller output, that is for either direct operation, the determination of a low limit, or reverse operation, the determination of a high limit. Amplifier 40 serves to add the set-point signal to the output of amplifier 10 or to the inverted output of amplifier 10, depending upon the position of switch 28. In direct operation the batch limit at the output of amplifier 40 is a low limit, $Vll$, where $$Vll = -SP - K(PV - SP + B);$$

and, in reverse operation the batch limit is a high limit, $Vhl$, where $$Vhl = -SP - K(SP - PV - B).$$

In the above equations:
SP=set point
PV=process variable
B=bias
K=gain

The output of amplifier 40 is compared with the process controller output which is applied at terminal 49. This, through the second gang of switch 28, is the input to amplifier 60 which is a high gain amplifier to control FET 72. Amplifier 60, in reverse action does not allow the process controller output to exceed the absolute magnitude of amplifier 40. In direct action, amplifier 60 does not allow the process controller output to become less than the absolute value of the output of amplifier 40. Amplifier 60 manipulates the process controller output, when necessary, by controlling the current from the source to the drain of FET 72 which is connected to the input of the integrator of the process controller. The output of the process controller is thereby limited to a low limit $Vll$, where $$Vll = SP + K(PV - SP + B);$$

or a high limit $Vhl$, where $$Vhl = SP + K(SP - PV - B).$$

In the above equations:
SP=set point
PV=process variable
B=bias
K=gain

When the Batch Option Module is in operation, the output of amplifier 60 will cause light emitting diode 69 to emit its light signal.

Amplifiers 90 and 110 form a comparator circuit. When the comparator circuit senses that the Batch Option Module no longer has control of the process controller output, that is the controller is within its normal operating range, the comparator circuit will deactivate the Batch Option Module. The comparator circuit mode is manually selected by switch 78 which has three positions: "Off", "Semiauto", and "Auto".

When switch 78 is in the "Off" position a positive fifteen volt (+15 volt) is applied from terminal 281 to the positive input of amplifier 110. The output of amplifier 110 is therefore positive and FET 72 is off, FET 72 does not conduct. In this operational mode, the Batch Option Module is always off and the process controller operates in its normal manner.

When switch 78 is in the "Semiauto" position, the Batch Option Module will operate once when required but it must then be manually reset before it will function again. Before a batch cycle begins the Batch Option Module is reset by manually turning switch 78 to the "Off" position and then turning it to the "Semiauto" position. This will cause amplifier 90 to be in positive saturation; overriding the signal from the gate of FET 72, thereby holding amplifier 110 in negative saturation and enabling amplifier 60 so that it can control FET 72. If the process variable changes so that the Batch Option Module is activated, the voltage at the gate of FET 72 will rise putting amplifier 90 into negative saturation and it is held there by diode 98 until the Batch Option Module is manually reset. This rise of the voltage at the gate of FET 72 will cause amplifier 110 to remain in negative saturation enabling amplifier 60 and allowing FET 72 to control the output of the process controller. As the process variable approaches the setpoint, the output of the process controller no longer tries to exceed the batch limits set by the Batch Option Module. This provides an input to amplifier 60 to lower the voltage at its output 63 and at the gate of FET 72, thus FET 72 no longer conducts, that is it no longer controls the output of the process controller. The lowering of the voltage at the output 63 of amplifier 60 causes amplifier 110 to go into positive saturation, thus amplifier 60 is held in negative saturation and FET 72 is held in the nonconducting state until the Batch Option Module is manually reset for the next batch cycle.

When switch 78 is in the "Auto" position, the integral limit of the process controller, supplied at terminal 96, is applied to the positive input terminal 92 of amplifier 90. In the "Auto" position, the Batch Option Module is deactivated until an integral limit of the process controller is reached at which time the Module will activate itself. When the output of the process controller reaches an integral limit the comparator circuit formed by amplifiers 90 and 110 activates the Batch Option Module. The integral limit, applied at terminal 96, forces amplifier 90 into positive saturation which in turn forces amplifier 110 into negative saturation. This enables amplifier 60 as in the "Semiauto" mode. When the process variable, applied at terminal 20, increases, the voltage at the output 63 of amplifier 60 increases to cause FET 72 to conduct to limit the output of the process controller. When the process variable approaches the setpoint, the Batch Option Module functions in the same manner as explained above for the "Semiauto" mode. However, in the "Auto" mode amplifier 90 is automatically reset if the process controller again reaches an integral limit, rather than requiring a manual operation as it did in the "Semiauto" mode.

Close temperature control, typically within one degree Fahrenheit ($\pm 1°$ F.) is required in batch reactors to insure product quality. With the exothermic reactions normally encountered, having the batch temperature exceed the setpoint, that is overshoot of the setpoint, cannot be tolerated. In addition price competition dictates that the minimum batch cycle time be utilized to reduce costs. These conditions require tightly tuned process controllers with the capability of maintaining a fast rate of heat-up and zero overshoot.

Figure 3:
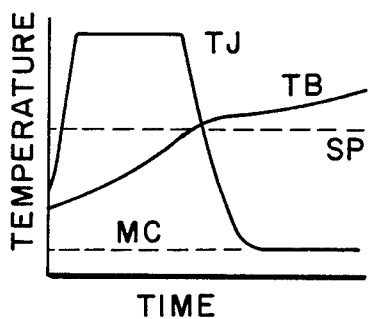
FIG. 3 shows a typical response curve of the heat-up portion of an exothermic batch reaction with a standard process controller.
Figure 4:
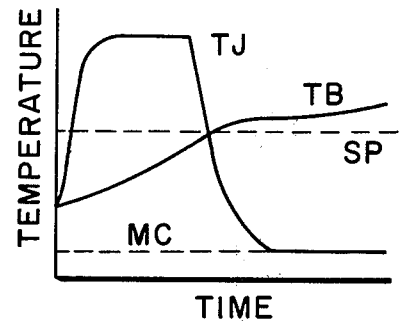
FIG. 4 shows a typical response curve of the heat-up portion of an exothermic batch reaction with a process controller which has a standard anti-reset windup module.
Figure 5:
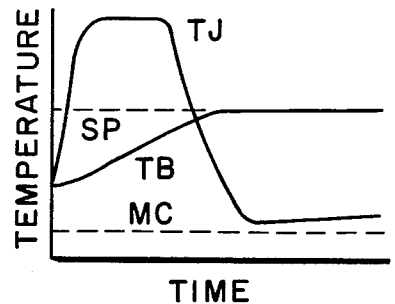
FIG. 5 shows a typical response curve of the heat-up portion of an exothermic batch reaction with a process controller which includes the Batch Option Module of this invention.

FIGS. 3, 4, and 5 show response curves for a typical control system for controlling the batch temperature during the heat-up phase of an exothermic batch reaction cycle. FIG. 3 represents a typical temperature response for a process controller which does not include an anti-reset windup module. The response shown in FIG. 4 is typical for a process controller having an anti-reset windup module. And the temperature response shown in FIG. 5 exhibits the improved response possible by the use of the Batch Option Module of this invention. In each of these figures:

SP=set point
MC=maximum cooling temperature
TB=temperature of the batch or process
TJ=temperature of the water cooling the reactor jacket.

The process controller of FIG. 3 does not have an anti-reset windup module. Without the anti-reset windup module, whenever a sustained deviation from the setpoint is imposed upon the process controller, the controller output will eventually be driven off scale. In that event, no control action is possible by the process controller until it has recovered from being driven off scale. In FIG. 3 the batch temperature TB is rising as the process controller is recovering from being driven off scale. The process controller recovers as the batch temperature TB reaches the setpoint SP and the controller quickly provides maximum cooling to reduce the reactor jacket temperature TJ in an attempt to prevent the process variable, the batch temperature TB, from exceeding the setpoint SP, that is to prevent overshoot. However, cooling has not been initiated soon enough; thus, overshoot cannot be prevented.

An anti-reset windup module was added to the process controller for the temperature control of the heatup phase of the batch reaction cycle shown in FIG. 4. The use of any anti-reset windup module will reduce the overshoot by the process variable; however, the overshoot is not eliminated entirely unless the module's high limit is set so low as to greatly extend the time required to complete a batch cycle.

FIGS. 3 and 4 are also used to indicate a problem frequently encountered with exothermic batch reaction cycles. In an effort to reduce the time required for the entire cycle, the temperature is allowed to rise rapidly during the heat-up phase. However, with this rapid temperature rise, when the batch temperature of the exothermic batch exceeds the setpoint, the reactor cooling system is often unable to provide sufficient cooling to lower the batch temperature to the setpoint. This is shown in FIGS. 3 and 4 in which the batch temperature TB remains above the setpoint SP even though the reactor jacket temperature TJ has been reduced for maximum cooling MC.

FIG. 5 shows the temperature response to a process controller having the Batch Option Module of this invention. The Batch Option Module forced down the output of the process controller before the batch temperature TB reached the setpoint SP. Thus the process controller was able to bring the batch temperature TB to the setpoint SP without overshoot. Since there was no overshoot, the heat generated by exothermic reaction did not exceed the cooling capacity of the reactor and the batch temperature was maintained at the setpoint.

Figure 6:
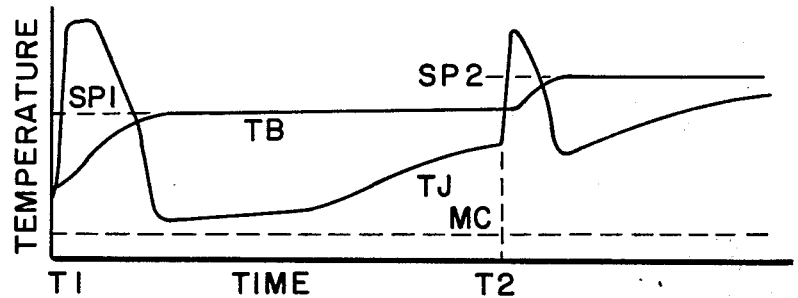
FIG. 6 is a graph of a complete reaction cycle controlled by a process controller having the Batch Option Module of this invention.

FIG. 6 shows the temperature response during an entire exothermic batch reaction cycle in a jacketed reactor. The temperature of the batch TB is controlled by supplying cooling water or steam to the jacket of the reactor. The batch temperature TB is the input to a first process controller. The jacket temperature TJ is the input to a second process controller. The first and second process controllers operate in a cascade configuration, that is the output of the first process controller is used to adjust the setpoint of the second process controller and the output of the second process controller is used to control the jacket temperature TJ. The jacket temperature TJ closely follows the output of the first process controller. The first process controller includes a Batch Option Module. The reactor is charged with all of the reactants and the reaction is initiated at time T1 by the addition of heat. The setpoint on the first process controller is raised to a first setpoint SP1 which causes the output of the first process controller to rapidly increase to its integral limit which activates the Batch Option Module. As the batch temperature TB increases, the batch limit of the Batch Option Module forces the output of the first process controller to decrease to begin cooling. As the batch temperature TB approaches the setpoint, the process controller output no longer tries to exceed the batch limit, the Batch Option Module is deactivated automatically, and the first process controller begins normal control without overshoot of the setpoint by the batch temperature TB. At time T2 the setpoint of the first process controller is raised to a second setpoint SP2 to complete the batch reaction cycle. Raising the setpoint causes the output of the first process controller to again rapidly increase to its integral limit which automatically reactivates the Batch Option Module. Heat up of the batch and the operation of the process controller and the Batch Option Module proceeds as described above.

Many modifications and variations to the Batch Option Module circuit described herein will occur to those skilled in the art in light of the teachings. For example, we have illustrated and described a specific circuit; however, other circuits may be designed to perform the identical function. It is therefore to be understood that the present embodiment is therefore to be considered as illustrative only and not restrictive, the scope of the invention being indicated by the appended claims rather than by the foregoing description.

We claim:

1. A Batch Option Module for a process control instrument, comprising:
    first amplifier means for comparing the measured process variable and the setpoint of said process control instrument;
    means for biasing the output of said first amplifier means;
    second amplifier means for adding the setpoint to the output of said first amplifier means;
    third amplifier means for preventing the output of said process control instrument in direct action from exceeding the absolute magnitude of the output of said second amplifier means and for preventing the output of said process control instrument in reverse action from being less than the absolute magnitude of the output of said second amplifier means;
    means controlled by the output of said third amplifier means, for controlling the current flow to the integrator of said process control instrument whereby the output of said instrument is limited according to the formulas:

$$VHL = SP + K (SP - PV - B) \text{ or}$$

$$VLL = SP + K (PV - SP + B)$$

in which
    VHL = high limit
    VLL = low limit
    SP = setpoint
    PV = process variable
    B = bias
    K = gain; and
    first and second comparator means for activating said Batch Option Module when said process control instrument approaches the limits of its control range and for deactivating said Batch Option Module when said process control instrument is within its normal control range.

2. A Batch Option Module for a process control instrument, said process control instrument including an integrator and having a setpoint, a control range, and an output, and having a current flow to said integrator, comprising;
    first means for comparing the measured process variable and the setpoint of said process control instrument;
    second means for biasing the output of said first means;
    third means for adding the setpoint to the output of said first means;
    fourth means for preventing the output of said process control instrument in direct action from exceeding the absolute magnitude of the output of said third means and for preventing the output of said process control instrument in reverse action from being less than the absolute magnitude of the output of said third means;
    fifth means controlled by the output of said fourth means, for controlling the current flow to the integrator of said process control instrument whereby the output of said instrument is limited according to the formulas:

$$VHL = SP + K (SP - PV - B) \text{ or}$$

$$VLL = SP + K (PV - SP + B)$$

in which
    VHL = high limit
    VLL = low limit
    SP = setpoint
    PV = process variable
    B = bias
    K = gain; and
    first and second comparator means for activating said Batch Option Module when said process control instrument reaches the limits of its control range and for deactivating said Batch Option Module when said process control instrument is within its normal control range.

3. A method of modifying the output of a process control instrument within the control limits of said instrument, through the use of a Batch Option Module, which comprises:
    measuring a process variable,
    comparing said measured process variable to the setpoint of said process control instrument,
    producing a first output signal indicative of the difference between said measured process variable and said setpoint of said process control instrument,
    biasing said first output signal,
    adding said setpoint to said biased first output signal to provide a second output signal,
    activating said Batch Option Module when the output of said process control instrument reaches a limit of the control range and deactivating said Batch Option Module when the output of said process control instrument is within its normal control range, using said Batch Option Module to prevent the output of said process control instrument in direct action from exceeding the absolute magnitude of said second output and to prevent the output of said process control instrument in reverse action from being less than the absolute magnitude of said second output, by controlling the current flow to the integrator of said process control instrument whereby the output of said instrument is limited according to the formulas:

$$VHL = SP + K(SP - PV - B) \text{ or}$$

$$VLL = SP + K(PV - SP + B)$$

in which
VHL = high limit
VLL = low limit
SP = setpoint
PV = process variable
B = bias
K = gain.